Oct. 2, 1945.   E. ROLKER   2,385,882
ARTICLE WEIGHING AND HANDLING APPARATUS
Filed April 8, 1942   6 Sheets-Sheet 1

FIG. 1.

Inventor
Edwin Rolker.
By
Cushman, Darby, Cushman
Attorneys

Oct. 2, 1945.    E. ROLKER    2,385,882
ARTICLE WEIGHING AND HANDLING APPARATUS
Filed April 8, 1942    6 Sheets-Sheet 6

Inventor
Edwin Rolker
By Cushman, Darby & Cushman
Attorneys

Patented Oct. 2, 1945

2,385,882

UNITED STATES PATENT OFFICE 2,385,882

ARTICLE WEIGHING AND HANDLING APPARATUS

Edwin Rolker, Baltimore, Md., assignor to Crown Cork & Seal Company, Inc., Baltimore, Md., a corporation of New York Application April 8, 1942, Serial No. 438,163

18 Claims. (Cl. 209—121)

The present invention relates to an article weighing and handling apparatus.

While the invention is described herein as used in connection with the weighing of cans containing beer, it will be understood that the invention is applicable for the weighing of articles of various types and that the structures for handling articles disclosed herein may be used in apparatus other than weighing apparatus.

In the packaging of beer in cans, pasteurization of the cans after they have been filled and sealed occasionally causes a can to leak. It has been found that the weighing of cans after pasteurization is the most practicable system whereby a leaky can may be detected, since the leaks are frequently so small that observation or inspection alone is not satisfactory.

An important object of the invention is to provide apparatus whereby articles may be weighed without interrupting their movement and articles not complying with a certain weight standard readily may be rejected.

It has heretofore been proposed to segregate articles according to their weight by means of weighing elements mounted upon a rotary table, but the segregating or deflecting means of these prior apparatus usually have been rather complicated in construction and too slow in action, thereby reducing the production capacity of the machine; or the deflecting mechanism physically interfered with the movement of all articles through the machine.

An important object of the present invention is to provide a mechanism for separating articles according to their weight which is extremely simple in construction and can be actuated at high speed without damaging the articles.

Another object of the invention is to provide a weighing element for use in weighing apparatus which is particularly adapted for the handling of articles moving at high speed in a circular path.

It has been found that in order to operate a weighing machine including a rotary table at high speed, it is necessary that the articles be prevented from sliding off the platform due to centrifugal action. More particularly, if the platform supporting the articles is permitted to tilt downwardly at its outer edge, the articles tend to slide outwardly. If a weighing machine is used for handling beer cans which have just moved through a pasteurizer, the cans will leave water upon the weighing platforms and the tendency of the cans to slide will thereby be increased. It is not practicable to apply an outer guard or gripping means to each platform to hold the articles against outward movement under the impetus of high speed rotation of the table since the articles must be placed on and removed from the platforms by movement over the outer edge of each platform. By constructing a weighing element in such manner that the platform will be held horizontal, or with its outer edge at least as high as its inner edge, the possibilities of a can sliding therefrom are held to a minimum.

The present invention includes weighing elements of such construction that though the weighing beam may tilt, the scale platform which supports the article will always be maintained in a horizontal plane.

A further object of the invention is the provision of a weighing apparatus of means enabling the detector mechanism to be readily adjusted to the desired degree of sensitivity without stopping operation of the machine.

Most weighing machines can only be adjusted for different tolerances by adjusting each weighing element individually, an operation which may require thirty or forty minutes to perform. By the present invention, tolerances can be adjusted simply by varying the position of a detector.

Most high-speed and highly sensitive apparatus for weighing articles while the latter are in movement include a knife-edge element past which moves a trip fixed to each article weighing and supporting member. For example, if an article is of light weight, the corresponding trip will move above the knife-edge, but if it is of proper weight, the trip will move below the knife-edge. Subsequently, according to the path in which it moves, the trip may contact with an element which will control the operation or non-operation of a reject member. In short, the knife-edge element acts as a segregating device to control the vertical plane in which the trips will move.

A principal difficulty with a machine of the type just discussed is that the trips frequently move against the knife-edge on a dead line, thereby fracturing the edge or breaking a weighing element and rendering the machine temporarily inoperative. It will be observed that any machine which requires that trips move in a positively defined path to control operation of a reject member must include some element corresponding to a knife-edge to segregate the trips in their proper paths.

An important object of the present invention is to provide a highly sensitive and high speed machine of such design that there is no necessity of positively defining the path in which a trip must move for operation of a reject mechanism. By this arrangement, the necessity for a knife edge is completely eliminated.

Another object of the invention is to provide an article handling apparatus of such construction that different types of articles readily may be handled thereon.

In numerous production lines it is necessary to provide entirely different machines to operate upon articles of different sizes. For example, in some beverage packaging plants, it is necessary to provide different filling or sealing machines to handle different types of containers due to the fact that the containers of one type cannot be operated upon by the filling or sealing heads used with containers of other type. The present invention contemplates the provision of a machine of such design that articles, for example, containers, of different types and sizes, can be selectively handled thereon. For that purpose, the apparatus of the present invention includes a rotary table which, in the present embodiment, is provided with two types of weighing elements, each of a different capacity, and alternately arranged about the rotary table. The invention further contemplates means to selectively feed containers to either one set of elements or the other, preferably in combination with means to selectively remove containers from either one type of element or the other.

Another object of the invention is the provision of an apparatus designed to selectively handle runs of different-sized articles.

A further object of the invention is to provide an apparatus for handling articles of at least two different sizes and wherein the article supporting elements are so arranged that they may be spaced a minimum distance apart.

As applied to a weighing apparatus, the above objects with regard to handling articles of different types and sizes comprehend the provision of a machine which can be quickly converted for weighing runs of articles of various weights with but a minimum number of adjustments to the machine.

Still another object of the invention is the provision on a machine for handling different types of articles of a timing device which is readily adjustable to deliver articles in properly spaced relation to various types of infeed dials.

Other objects and advantages of the invention will be apparent from the following specification and drawings wherein.

Throughout the following description, the mechanisms of the invention are described in connection with the handling of beer cans. However, it will be understood that the invention is applicable to the handling of numerous types of articles.

The construction and operation of the present invention may be generally described as follows: Cans, for example, 32 oz. beer cans L, are delivered to the machine on an infeed conveyor 20 (Figure 1) which moves across a work table 21 to carry the cans to a rotary infeed dial 22. As the articles come adjacent the dial 22 they are engaged by a screw type conveyor 23 which times the articles with respect to the pockets of dial 22.

Articles received by dial 22 are positioned upon the scale platforms of weighing elements 24 arranged radially of a rotary table 25 and, as the table rotates, the platform of the weighing element will assume a position with respect to the table 25 in accordance with whether can L is filled to the proper weight or is of lighter weight.

Figure 1:
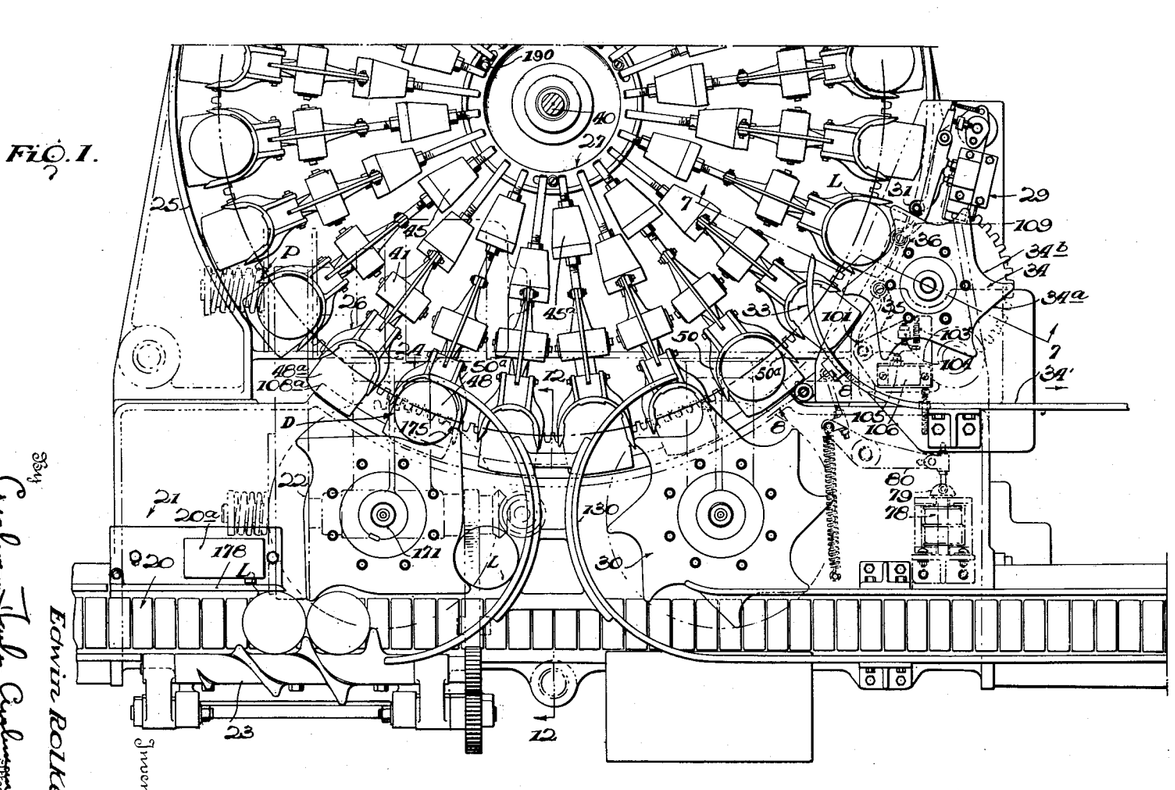
Figure 1 is a plan view of a can weighing apparatus provided with the mechanisms of the present invention.
Figure 11:
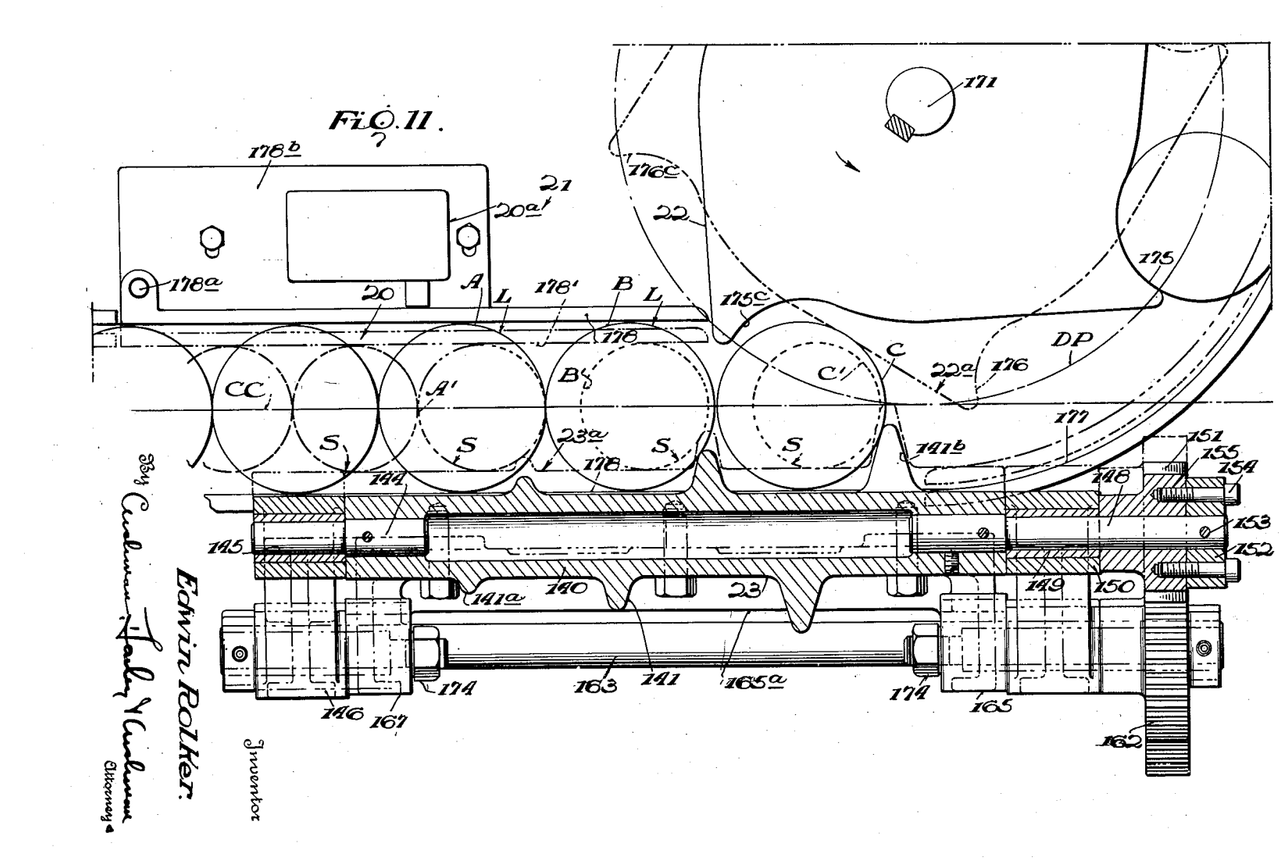
Figure 11 is a plan view of the infeed mechanism included in the invention, the view being partly in horizontal section.

The rotary table 25 is preferably equipped with a series of weighing elements 24 of a size and construction to handle cans of a predetermined size, for example, the 32 oz. cans L. In addition, it is equipped with weighing elements 26 adapted to handle cans of a different size, for example, 12 oz. beer cans S, such as indicated in Figure 11. As shown in Figure 1, the elements 24 and 26 are alternately arranged on the table 25 and the infeed mechanism, including the screw conveyor 23 and the rotary dial structure 22, is selectively adjustable so that incoming cans may be placed upon weighing elements of the type designated to handle such cans, the other weighing elements then receiving no articles from the infeed dial.

In order that the set of weighing elements for one type of can may be held out of operation during handling of a run of another type of can, a locking ring 27 is mounted at the center of table 25. Locking ring 27 is provided with a plurality of upwardly extending shoulders 28 shown in Figure 7. By turning ring 27 as desired, the shoulders 28 may come beneath the inner ends of the weigh beams of the elements which are not to be used, so that the weighing platforms will be locked downwardly against vertical movement. This arrangement to prevent vertical movement of the weighing elements not in use is desirable in order to prevent the same from operating a weight detector mechanism hereinafter described.

The weight detector mechanism is generally designated by the numeral 29 and, as best shown in Figure 1, is positioned slightly in advance of the outfeed dial 30 which receives cans of proper weight from the weighing elements and positions them upon the outfeed portion of the straight line conveyor 20.

Weight detector mechanism 29 includes a lever 31 extending substantially tangential with respect to the table 25. If the machine is being operated to handle 32 oz. cans L and a weighing element 24 carrying a can L of less than proper weight approaches lever 31, a trip plate 32 associated with the platform of the weighing element 24 will be in the raised position shown in Figure 9 by dotted lines. As a result, trip 32 will strike the free end of the lever 31, moving the latter outwardly and closing an electrical circuit which will cause a reject arm 33 to swing to the solid line position shown in Figure 2 and deflect the can L from the platform of element 24 to move with a continuously rotating reject dial 34 to a reject path 34'. Hence, the can L in question will not reach the outfeed dial 30 and the outfeed end of the straight line conveyor 20.

Figure 2:
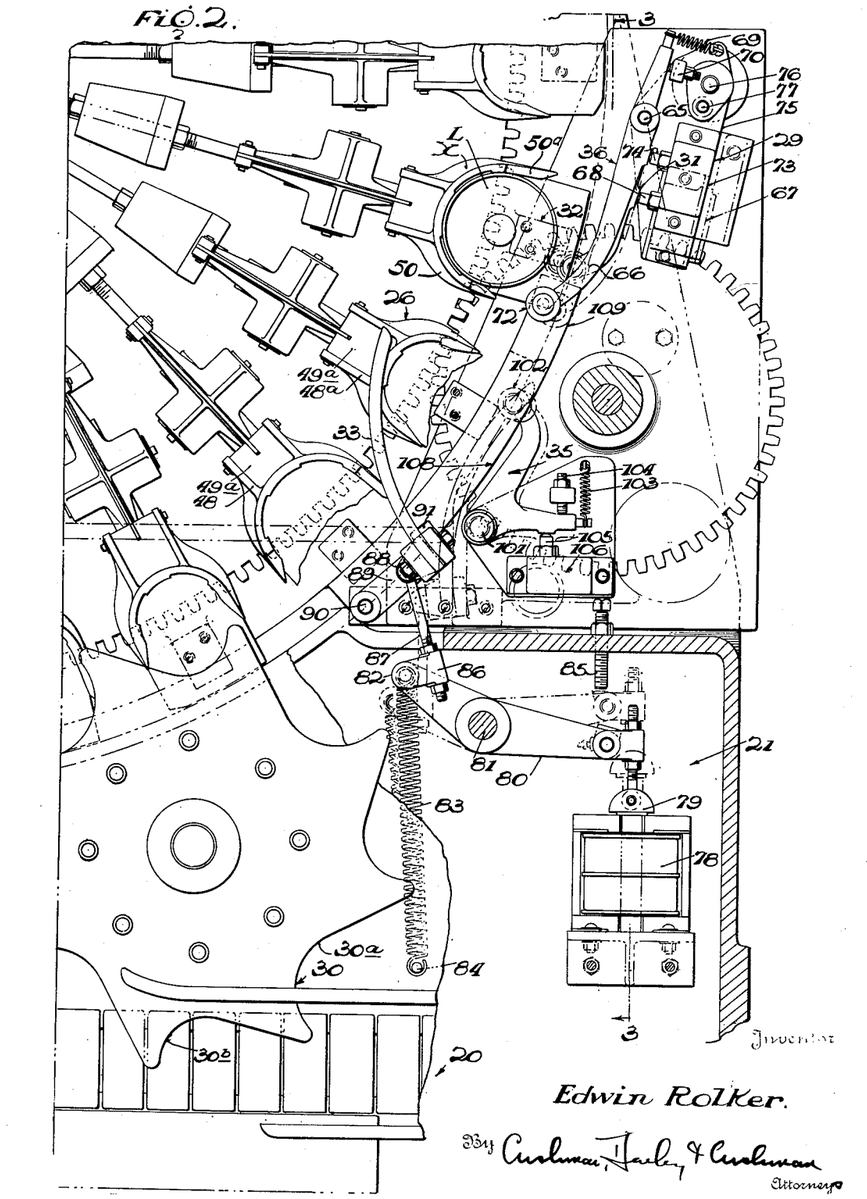
Figure 2 shows the operating elements included in the weight controlled mechanism in plan, the view being a horizontal section on the line 2—2 of Figure 3.

The circuit which is energized by the above described operation of weight detector lever 31 is of such character that it will be held closed until the trip member 32 strikes a resetting device 35 shown in plan in Figure 2. Contact of the trip 32 with the reset device 35 will cause the above described circuit to be reopened so that the reject member 33 will swing immediately behind the diverted can L, to its normal and dotted line position shown in Figure 2. The reject member will thereby be in its normal position before the next weighing member 24 reaches the detector 31 and, therefore, will be in position to respond to any actuation of the detector 31 by the succeeding weighing member 24.

The detector mechanism 29 preferably also includes a lever 36 so positioned that it will be responsive to the presence of a can on a weighing member and the detector circuit is of such type that the reject member 33 will not be operated to reject position unless a weighing member has a can on the same and the can is of light weight. It will be apparent that without this provision, the detector mechanism 31 would be actuated by a weighing member which is in raised position due to the fact that it is not supporting a can.

The manner of driving the infeed conveyor 20, screw conveyor 23 and infeed dial 22, as well as the arrangement whereby the elements 22 and 23 are adjusted for the handling of different sizes of cans is hereinafter described. However, it will be understood that the shaft which carries the infeed dial 22 and the other infeed elements are driven in synchronism with the rotary table 25. Reject dial 34 and outfeed dial 30 are also driven in synchronism with table 25.

Figure 7:
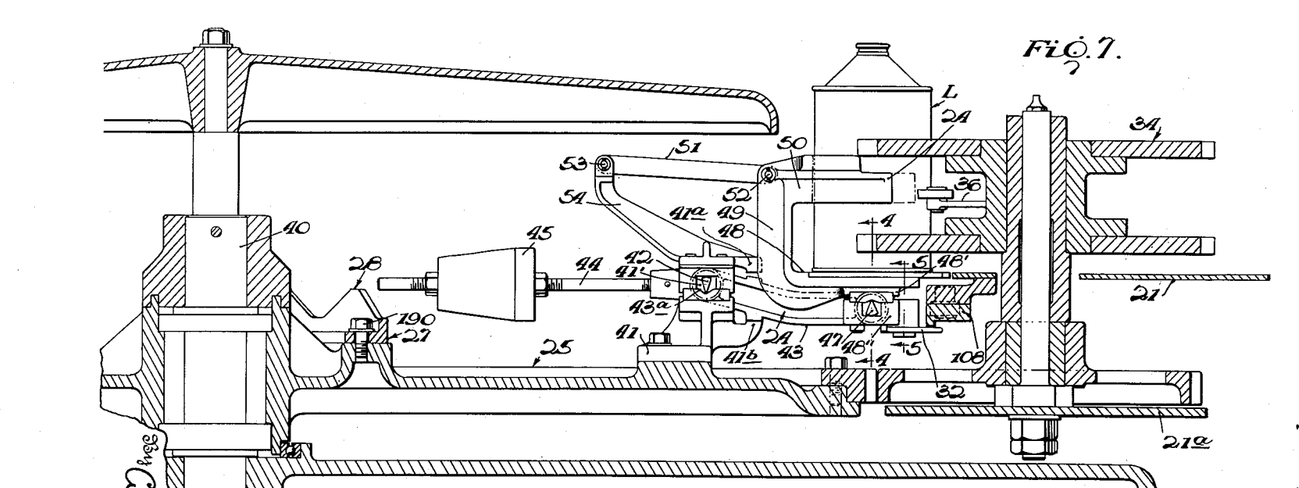
Figure 7 is a radial sectional view substantially on the line 7—7 of Figure 1.

Referring to Figure 7, the rotary table 25 is fixed to a vertical shaft 40 driven through any suitable mechanism and, adjacent its periphery, is provided with a series of bearing blocks, each of which has the stationary bracket 41 of a weighing element 24 or 26 bolted thereto. Except as hereinafter described, the weighing elements 26 for small cans S are identical with the large can weighing elements 24 and a description of the latter will apply to both.

As shown in Figure 7, each bracket 41 includes a horizontal aperture 41' extending transversely of the radius of the rotary table 25 and an intersecting aperture extending radially of the table. Through the latter aperture a scale beam member 43 extends. The member 43 carries a pivot pin 42 and the ends of this pin, of knife edge form on their lower surfaces, extend into the transverse apertures 41' to bear on the lower surface 43a thereof to serve as a pivot point for the beam member.

Figures 3, 4, 5, 6:
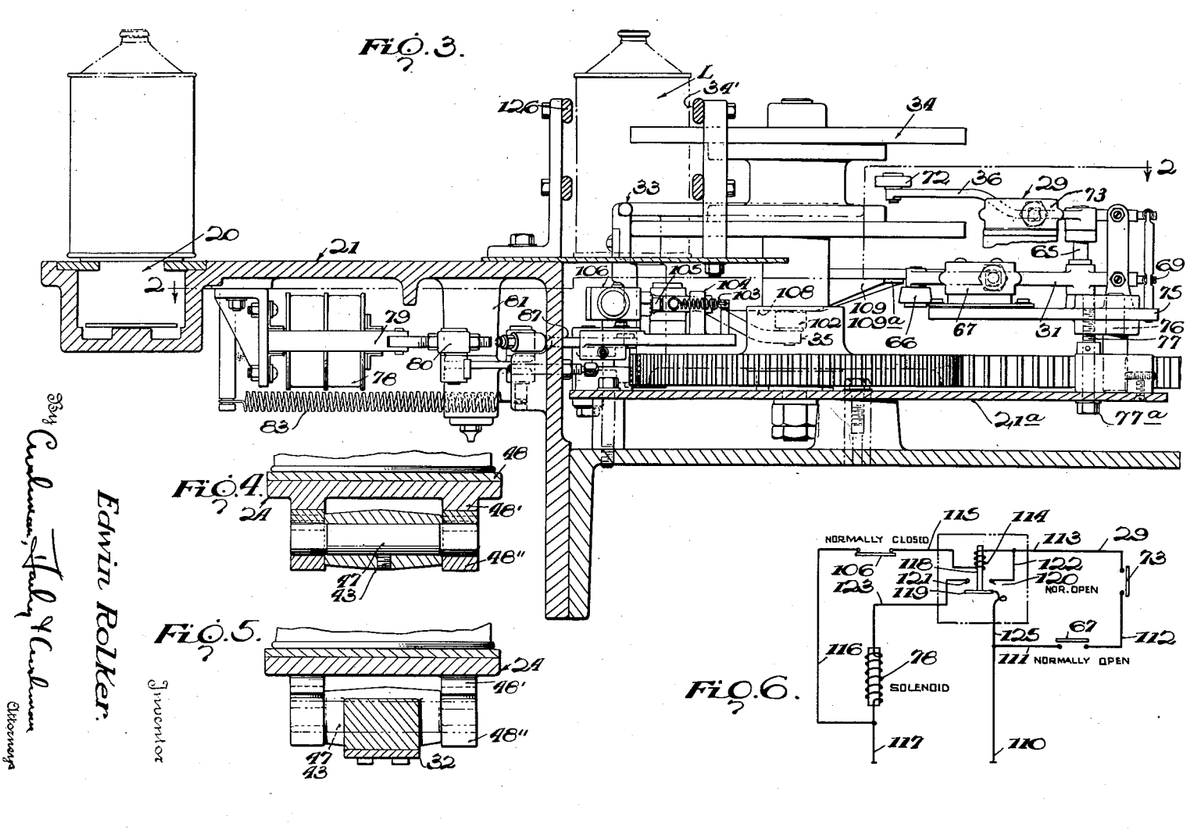
Figure 3 is a vertical sectional view on the line 3—3 of Figure 2.
Figure 4 is a vertical sectional view on the line 4—4 of Figure 7.
Figure 5 is a vertical sectional view on the line 5—5 of Figure 7.
Figure 6 diagrammatically shows the electrical circuit of the weight controlled mechanism.

In back of the pivot pin 42 each beam 43 has a horizontally extending rod 44 secured thereto on which an apertured balance 45 is fixedly secured, as by means of nuts engaging the two ends of the balance as illustrated in Figure 7. In this way, the position of the balance can be accurately adjusted and maintained. Each beam member 43 rigidly carries a pin 47 near its outer end and, as shown in Figure 4, the ends of this pin extend beneath spaced bearing plates 48' secured to platform 48. The ends of pin 47 are knife-edged on their upper surfaces to pivotally support platform 48 by contact of the plates 48' on the pins. Upwardly facing U-shaped blocks 48'' secured beneath the plates 48' surround the ends of the pins 47.

As shown in Figure 7, each platform 48 includes two upwardly extending arms 49 at its inner portion. The arms 49 have a web 49a joining their upper ends as shown in Figure 2 and curved arms 50 extend forwardly, as shown in Figure 1, to partially encircle a can positioned upon the platform. The arm 50a which will be behind a can during rotation of table 25 is somewhat longer than the other arm 50, for a purpose hereinafter described.

Referring to Figure 7, the web 49a has a link 51 pivotally secured thereto as indicated at 52, the inner end of link 51 being pivotally connected at 53 to an arm 54 extending upwardly and inwardly from the fixed bracket 41. It will be noted that this mounting of the weighing elements 24, including the pivotal connection between the platform 48 and the weigh beam 43, as well as the arrangement of the link 51, insures that platform 48 will always remain in a horizontal plane, regardless of tilting of the weigh beam. In other words, a line extending between pivots 42 and 47 will always be at the same angle with respect to a line between pivots 52 and 53.

It will be noted from Figure 7 that the brackets 41 include vertically spaced and outwardly projecting arms 41a and 41b which limit vertical movement of beam 43.

Referring to Figure 7, the outer end of each beam member 43 has a trip plate 32 fixed thereto, this trip being of substantially less width circumferentially of table 25 than the associated scale platform 48.

The construction of the weighing elements 26 for smaller cans S is identical with that of the weighing elements 24, except as to size. That is, since the cans of the two sizes are of different diameter, as well as of different weight, the areas of the platforms must be different. However, in order that both types of weighing elements 24 and 26 will have the cans carried thereby properly cooperate with the same reject dial 34 and the same outfeed dial 30, it is necessary to have the vertical axes of all cans on rotary table 25 stand on the pitch line P shown in Figure 1. Therefore, while the platforms 48a of the weighing elements 26 for smaller cans are of smaller size, they are of such design, and are so positioned with respect to the rotary table 25 as to have the axes of the cans carried thereby stand on line P. In addition the trip plate 32 on each small can platform 48a must have its outer edge positioned on the same line circumferentially of table 25 as the trips 32 of the platforms 48.

It will also be understood, as indicated in Figure 1, that because the elements 26 handle articles of smaller weight, their balances 45a will be positioned closer to the scale beam pivot brackets 41, i. e., will in effect be staggered with respect to the balances 45, so that the weighing elements 24 and 26 positioned on lines extending radially of the axis of table 25, may be positioned as closely as possible.

The weight detector mechanism 29 is best illustrated in Figures 2 and 3. As there indicated, this mechanism includes a detector lever 31 pivoted intermediate its ends on a vertically extending stud 65 fixed to the base of the machine adjacent the periphery of table 25. Lever 31 has a roller 66 mounted at one end thereof, this end of the lever being turned inwardly toward the table. The same arm of lever 31 has a switch 67 associated therewith, including an operating button 68. A spring 69 is connected to the opposite arm of lever 31 in such manner as to urge the end carrying the roller 66 toward the axis of table 25, the movement of lever 31 in this direction being limited by a stop 70. As is hereinafter explained, contact of a trip 32 with roller 66 on lever 31 will swing the roller carrying arm of the lever outwardly, with the result that pressure will be exerted on button 68 to close a circuit through the switch 67.

As best indicated in Figure 3, a can detector lever 36 is also mounted on the stud 65 above the weight detector lever 31 and has a spring connected thereto to urge its opposite end, which carries a roller 72, inwardly toward the axis of the table 25. The roller carrying arm of can detector lever 36 has an electrical switch 73 associated therewith, including an operating button 74 positioned in the path of the roller carrying arm of the lever. As is hereinafter explained, whenever a can contacts with the roller 72 of can detector 36, the latter will swing into engagement with the operating button 74 to close an electrical circuit through the switch 73.

As shown in Figures 2 and 3, the stud 65 is fixed to a carrier plate 75 which also carries the switches 67 and 73. Carrier 75 is vertically slidable on a post 76 fixed to a plate 21a secured to the base of the machine beneath the surface of work table 21. As best shown in Figure 3, the position of plate 75 vertically with respect to post 76 can be adjusted by means of a screw rod 77 rotatable in the table portion and threaded in plate 75.

As is indicated in Figure 6, the switches 67 and 73 are in series. The remainder of the circuit of the detector mechanism is such that when both switches are simultaneously closed, a solenoid 78 (Figure 2) will be energized to draw its associated armature 79 inwardly (downwardly as viewed in Figure 2). Armature 79 has a bell crank 80 pivotally connected thereto, the bell crank being mounted on a vertical pivot 81 provided on the base of the machine. The opposite arm of bell crank 80 is provided with a stud 82, to which a coil spring 83 is secured, the opposite arm of the coil spring being connected to a stud 84 secured to the base of the machine. Spring 83 serves to hold the armature-connected arm of bell crank 80 against an adjustable stop 85, as is indicated in dotted lines in Figure 2. Energization of solenoid 78 moves the bell crank 80 to the position shown in solid lines in Figure 2.

Figure 8:
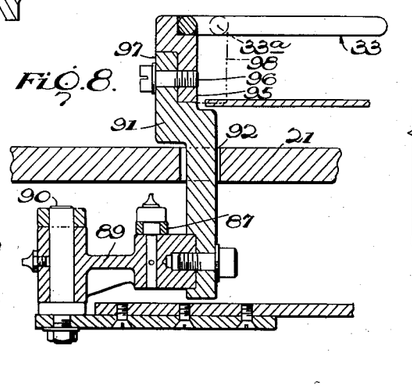
Figure 8 is a vertical sectional view on the line 8—8 of Figure 1.

The stud 82 of bell crank 80 also has pivoted thereon a bracket 86 in which a rod 87 is secured, the opposite end of rod 87 being pivotally connected as at 88 to a lever 89 pivoted to the base of the machine at the point 90. As shown in Figure 8, lever 89 has an upstanding arm 91 fixed to its free end, which arm extends upwardly through an arcuate aperture 92 in the table 21 and, at its upper end, carries the curved reject arm 33 in the manner indicated in Figure 8.

Figure 2 shows in solid lines the position of the principal connections provided between the reject arm 33 and the solenoid 78 during the time that the reject arm is in a position to remove a can from a weighing element. The position of these various parts at other times, i. e., when a can is not to be removed from a weighing element, is indicated in dotted lines in the same figure.

Due to the fact that 12 oz. cans are of smaller diameter than 32 oz. cans, it is necessary to use a different reject member 33a upon the vertical arm 91 when handling 12 oz. cans. Referring to Figure 8, the reject arm 33 is there illustrated in solid lines and it will be observed that a downward extension or block 95 on the reject member is held by a bolt 96 to an upward extension 97 on arm 91. In the event that 12 oz. cans are to be handled, the block 95 would be removed from arm 91 and a reject member 33a, including a block 95a having the horizontal thickness indicated by the dotted line 98 in Figure 8, would be secured to the extension 97.

The reject member 33a would have a curvature based on the same center point as the reject member 33, but of somewhat reduced radius, due to the fact that it is to define a smaller path. As indicated in Figure 2, when the reject member 33 is in can deflecting position as shown in solid lines, its curvature is such as to be concentric with the axis of the reject dial 34. It will be clear from the above that the alternate reject member 92a would also be concentric with the axis of reject dial 34.

Figure 10:
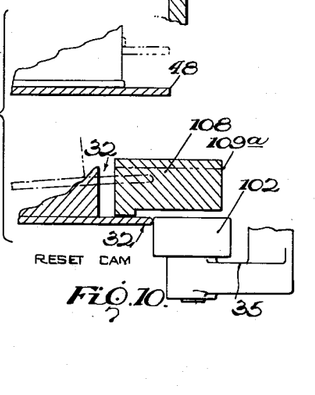
Figure 10 is a radial vertical section diagrammatically showing the operation of the weight detector reset device by a platform trip.

In order to restore the reject member to the normal position shown in dotted lines in Figure 2 with a movement so timed as to, in effect, follow the deflected can in the movement of the latter about the reject dial 34, a reset switch is provided at a point somewhat past the detectors 31 and 36 and beneath dial 34. The reset lever 35 is pivoted, as indicated in Figure 2, to a vertically extending stud 101 secured to the base of the machine and is provided at its free end with a roller 102 as best shown in Figure 10. Lever 35 is held in the path of the trips 32 by a coil spring 103 which acts upon an angled extension of the lever to hold the latter against a stop 104. When the roller carrying end of lever 35 is moved away from the axis of the rotary table as by contact of a trip 32 with its roller, the angled extension of the lever will contact with the operating button 105 of an electrical switch 106 to open a contact in the switch. Opening of this contact breaks the circuit which has been holding the solenoid 78 energized, so that the armature 79 of the solenoid may, under the action of the spring 83, move to its normal position indicated in doted lines in Figure 2.

In order that the upper surfaces of the platforms 48 or 48a or whichever set of weighing elements is in use will be maintained level with the upper surface of the table 21 when the platforms are adjacent the reject dial 34, outfeed dial 30 and infeed dial 22, a cam track 108 shown in section in Figure 7 extends alongside and beneath rotary table 25 during the above-mentioned portion of its path of travel. The entry end of cam track 108 is downwardly inclined as indicated at 109 and as shown in Figure 3. More specifically, as shown in Figure 3, the entry end 109a of the downward incline 109 of cam 108 is immediately beyond roll 66 and the downward incline 109 continues to a point immediately in advance of the roller 102 on reset lever 35. From that point on and to its outlet end 108a shown in Figure 1, cam 108 has its lower surface in the same horizontal plane. As appears from Figure 10, reset roller 102 is beneath cam 108.

As also indicated in Figure 10, if a weighing element bears a can of correct weight, its trip 32 will be at its lower limit position. Therefore, the trip plate will not contact with any portion of the decline 109 of cam 108 but will move beneath and clear of the decline to contact with the horizontal portion of cam 108. However, if a weighing element bears a light weight can, the trip of that element, being raised as shown in dotted lines in Figure 10, will brush against the decline 109 and the latter will direct the trip 32 and the associated platform 48 to the solid line position of Figure 10. As hereinafter explained, each trip 32 will strike reset roller 102 while moving beneath cam 108 in fully lowered position. When a trip 32 is beneath cam 108, its beam 43 will be held down against the stop 41b on bracket 41 as shown in Figure 7.

The outfeed end 108a of cam 108 terminates just to the left of infeed dial 22 in Figure 1. By this arrangement, after a can has been positioned on a weighing element platform, rotation of table 25 will cause the corresponding trip to move from the end of the cam so that if the can on the platform is of light weight, the balance 45 may move it to a lifted position in which beam 43 will contact with stop 41a (Figure 7) before the platform reaches detector 29. Otherwise, beam 43 will continue to bear on lower stop 41b as shown in Figure 7.

Stop 41a is so positioned that it will prevent a trip 32 from swinging any higher than the position shown in dotted lines in Figure 10. Hence, a trip can never swing so high that it will strike the vertical face 109a of cam 108 shown in Figure 3.

As shown in Figure 10, cam 108 may be recessed or notched at the outer portion of its lower surface to form a narrow shoulder, thereby reducing friction between the cam and trips bearing against the same.

The upward projections 28 on locking ring 27 are of such height that they will hold beams of the set of weighing elements not in use down against the stops 41b so that their trips 32 will move freely beneath cam 108.

In order to accommodate the container supporting or weighing elements of the rotary table 25 to the type of article being handled, it is only necessary to adjust the position of the locking ring 27 so that the type of elements to be operative will be free for vertical movement with respect to the table. Thus, if larger articles such as 32 oz. beer cans are to be handled, locking ring 27 would be released by loosening bolts 190 which secure it to the rotary table 25 and turning the ring to position the upstanding teeth 28 beneath the beam arms 44 of the elements 24.

It will be noted that the reject dial 34 is provided with pockets which will move opposite and in alignment with every container-supporting element 24 and 26 which moves adjacent the same. That is, dial 34 has alternately arranged large and small pockets 34a, 34b respectively arranged to move opposite and with the elements 24 and 26. The outfeed dial 30 is also provided with alternately arranged large and small pockets 30a and 30b which will respectively move opposite to and with the alternately arranged container-supporting elements 24 and 26.

The operation of the weight detector mechanism is the same, regardless of whether the weighing elements 24 or 26 are in use. For that reason, the following description of its operation with the 32 oz. elements 24 will suffice: If the platform 48 of a weighing element 24 receives a can L having contents of less than proper weight, the balance 45 of that element will cause its platform 48 to rise after the associated trip moves out of cam track 108 and at least before the weighing element approaches the detector mechanism 29. While the platform 48 carrying the can will be in a horizontal plane as indicated in dotted lines in Figure 9, due to its mounting with respect to the bracket 41, the trip element 32 will be tilted as shown in dotted lines in Figure 9, since the trip element is carried by the tiltable weight beam 43.

Figure 9:
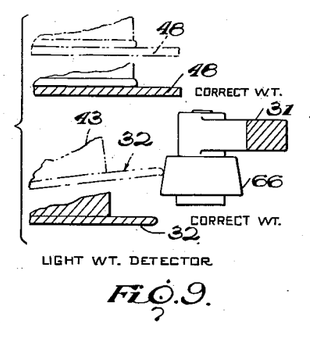
Figure 9 is a radial vertical section diagrammatically showing the operation of the light weight detector by a platform trip.

As shown in dotted lines in Figure 9, the trip element 32 will move in such plane that it will contact with the roller 66 of the detector lever 31 when it reaches the position indicated at X in Figure 2. Lever 31 will thereby be swung outwardly to exert pressure on the operating button 68 of switch 67. Since the platform 48 carries a can, the can will contact with the roller 72 of the can detector lever 36 and the position of the roller circumferentially of the path of the rotary table 25, is such that can detector lever 36 will close its associated switch 73 during the time that switch 67 is closed.

Referring to Figure 6, which diagrammatically indicates the wiring circuit of the machine, the closing of the switches 67 and 73 will cause current to flow from a line 110 and lead 111 across the now closed switch 67 and through lead 112 across the now closed switch 73 to a lead 113 connected to one end of a coil 114, the current flowing from coil 114 through a lead 115 and across the normally closed reset switch 106 to a lead 116 and thence to a line 117. The resulting energization of coil 114 will cause an armature 118 to be actuated to cause a moving contact 119 carried thereby to bridge fixed contacts 120 and 121. Bridging of these contacts will cause current to flow from lead 113 through a lead 122 to contact 120, across moving contacts 119 and thence to fixed contact 121 and a lead 123 connected to one end of the coil of solenoid 78. The other end of coil 78 is connected to line 117.

Solenoid 78 will thus be energized to pull its armature 79 inwardly (Figure 2) against the action of spring 83, thereby swinging the reject arm 33 from the dotted line position indicated in Figure 2 to the solid line position of the same figure. This movement of the reject member 33 will occur before the can on the platform 48 in question gets in the path of swinging movement of the member 33. When the can carried by the platform 48 contacts with the reject arm 33 it will be deflected from the platform 48 by the reject member 33 and carried across the table 21 by the reject dial 34. It will be clear that dial 34 is constantly rotating in synchronism with the rotary table 25, with one of its larger pockets 34a always coming opposite to each large can element 24 and one of its smaller pockets 34b coming opposite each element 26. A pocket 34a of dial 34 will therefore place the lightweight can L in the guideway 126.

It will be observed that once the moving contact 119 comes into engagement with the fixed contacts 120 and 121, the following circuit will be set up: From line 110 through a lead 125 to moving contact 119 and across the moving contact to fixed contact 121 and lead 123 to the coil of solenoid 78 so as to keep this solenoid energized. Also, because moving contact 119 is now in engagement with fixed contact 120, current will flow through lead 122 and into lead 113 through coil 114 and thence through lead 115, closed switch 106 and lead 116 to line 117, thereby holding or maintaining the circuit through coil 114. The two circuits just described, i. e., the holding circuit for coil 114 and the circuit through solenoid 78, will be maintained regardless of the fact that the two trip operated switches 67 and 73 will open immediately the trip and can have passed out of contact with the rollers 66 and 72, respectively.

At about the same instant that the can L comes into contact with the reject member 33, the trip 32 will come in contact with the roller 102 of the reset lever 35. Contact of the trip member 32 with roller 102 is assured by reason of the fact that the downward incline 109 has its entry end immediately past detector roller 66 and will thereby deflect the trip 32 downwardly from the dotted line position of Figure 10 to the solid line position of the same figure so that the trip must strike the roller 102.

When the trip 32 comes into contact with the roller 102 as illustrated in Figure 10, the reset lever 35 carrying this roller will be swung in a clockwise direction with respect to Figure 1 to thereby exert pressure upon the operating button 105 of normally closed switch 106. Referring to Figure 6, opening of switch 106 will break the circuit through coil 114 with the result that solenoid 78 will be de-energized. It therefore follows that spring 83 will be free to move the armature 79 of solenoid 78 to its normal or outward position shown in dotted lines in Figure 2. This may occur while the can L, now moving with dial 34, is still in the path of movement of reject member 33 but, in such case, the reject member 33 will simply swing to the right with respect to Figure 2 to, in effect, follow the can about the reject dial 34 well before a following can L can reach the reject member.

It will be observed from Figure 2 that at the moment the platform 26 discussed above is in position X preparatory to actuating detector levers 31 and 36, the trip 32 on the preceding small can weighing element 26 (which is locked against movement by ring 27) has already moved past roller 102 on re-set lever 35. Hence the circuit of Figure 4 must close. Similarly, at the time that trip 32 of the element 24 under discussion is in engagement with the re-set roller 102, the succeeding "locked-out" element 26 will not have reached the roller 66. In other words, the space between the rollers 66 and 102 is less than the space between two adjacent trips 32.

Considering now the case of a can L of correct weight on a weighing element 24, since the can is of sufficient weight to hold the associated balance 45 upwardly, when the platform 48 comes adjacent the detector mechanism 29, the platform 48 will be in the solid line position indicated in Figure 9 which is naturally lower than the dotted line position which would be assumed by any light-weight can. The trip 32 of a platform 48 carrying a correct weight can will also be in lowered position as shown in solid lines in Figure 7, the trip being so low that it cannot contact with the roller 66 of weight detector lever 31.

Therefore, the reject member 33 will remain in its normal and dotted line position shown in Figure 2. In this position, reject member 33 will prevent the can L from being removed from the platform 48 by any action of the reject dial 34, though a pocket 34a of the dial will move in aligned relationship with the weighing element. After trip 32 of a platform carrying a correct can has moved beneath the detector roller 66 as described immediately above, the trip will move beneath cam 109 to engage reset roller 102. This contact with reset roller 102 will cause normally closed switch 106 to be moved to an opened position but since the trip 32 in question did not contact with trip roller 66 to close switch 67 to thereby set up a circuit through coil 114 and solenoid 78, the opening of reset switch 106 will have no electrical effect.

It will be noted that when the weighing element 24 under discussion and carrying a correct-weight can engaged can detector roller 72, switch 73 was momentarily closed. However, since switch 73 is in series with weight detector switch 67, no circuit will be set up by the closing of switch 73, alone.

The correct-weight can will move into engagement with a large pocket 30a of outfeed dial 30 and be guided from the weighing element 24 by a fixed guide element 130 to move from the machine upon the outfeed portion of conveyor 20.

In the event that a weighing element 24 fails to receive a can from the infeed dial 22, the platform 48 of that weighing element will of course be in a raised position such as indicated in dotted lines in Figure 9 when the element approaches the weight detector roller 66 and the trip 32 of the weighing element will therefore contact with roller 66 to close switch 67. However, since there is no can upon the weighing element to engage the roller 72 of the can detector lever 35, only switch 73 will be closed and no circuit will be set up through coil 114 and solenoid 78. It will thus be observed that the provision of a can detector 36 prevents unnecessary operation of the circuit and the reject member 33.

As has been indicated above, it is thought that the operation of the detector mechanism with small cans S on platforms 26 will be obvious from the foregoing. It may be stated that the can detector lever 36 is urged by its spring to such position that its roller will be in the path of small cans S and the operating button 74 of the corresponding switch 73 will bridge its contacts on the shorter stroke initiated by a smaller can S. That is, with larger cans L, button 74 will bridge its contacts during the first portion of the movement of lever 36 and will then overtravel with the contacts still bridged.

If it is desired to adjust the tolerance in weighing, it is only necessary to rotate screw rod 77 (Figure 3) to raise or lower plate 75 and the mechanism carried thereby including roller 66. For example, referring to Figure 9, it will be clear that if roller 66 is raised with respect to the position of a correct weight trip 32, a greater tolerance will be allowed from a correct weight. On the other hand, if roller 66 is lowered, less tolerance will be permitted. This adjustment can be made while the machine is in operation since the weighing elements need not be adjustd. That is, if all of the weighing elements are properly adjusted at the time of initial assembly of the machine, a bottler need never adjust them to change tolerance, but need only adjust the vertical position of roller 66.

In previous apparatus in use, if a bottler wished to change tolerance, each weighing element had to be adjusted, and the operation could only be performed by stopping the machine for the relatively lengthy period required.

Since the can detector mechanism 36 is carried by plate 75, it will also move vertically when the plate is moved to adjust roller 66. However, this will not vary the operation of the can detector. It will be noted from Figure 3 that screw rod 77 is held in adjusted position by means of a lock nut 77a.

After they have moved past detector roller 66, all of the trips 32 move past reset roller 102 and, for that reason, no segregating element such as a knife-edge is necessary. More particularly, the trips 32 corresponding to correct weight cans move directly to roller 102 and other trips are readily directed to the plane of roller 102 by the decline 109. The provision of a control circuit of such nature that all trips can contact with its restoring element, roller 102, without setting up a restoring action except when required, contributes to the ability to eliminate a segregator. The mounting of the reject member and its operation of promptly moving out of the normal can path also contributes to the ability to eliminate a knife-edge or other segregator.

Another factor of importance is that the form of each trip 32 and the form of roller 66, with respect to each other, prevent breakage of either. That is, even if a trip 32 strikes the extreme lower edge of roller 66, no damage to either will result because spring 69 exerts only slight tension on lever 36. In other words, the slightest possible contact of a trip 32 with roller 66 will result in the lever 36 being properly actuated and without chipping or breakage of either a trip or the roll. The only other physical contact of a trip 32 with any element of the machine is that which may occur in contacting the decline 109 of cam 108, but this angular contact cannot cause breakage.

Summarizing the above, it will be seen that the point of contact of a trip 32 with roller 66 is the only point at which any distinction is made between correct weight and light weight trips. However, the trips and roller are of such form and the latter is so mounted that breakage cannot occur even if a trip is raised only sufficiently to partially contact with the extreme lower edge of roller 66. From this point onward, the only surface which the trips may strike will be the decline 109 of cam 108, and beyond decline 109 all trips will move in the same path.

In actual operation, if a can is leaky, it will have leaked sufficiently before its trip 32 reaches roller 66 that the trip will be in such substantially raised position as to fully contact the roller.

Roller 66 is tapered, the angle of taper being such that the face of the roller substantially conforms to the arc of vertical swinging movement of the trips 32 about their pivot points 42. For example, this is accomplished by so tapering roller 66 that its periphery is tangential to the arc through which the outer end of a trip 32 swings. Because of this, in extreme raised position a trip will have no greater contact with roller 66 than a trip which contacts with the roller near the lower edge of the latter. Hence, the roller and lever 31 will be swung outwardly to substantially the same extent, regardless of the vertical position of a trip which strikes the roller.

It is found very desirable to have the trips 32 carried by the most stable portion of a weighing element, i. e., the beam 43.

Because of the fact that table 25 carries weighing or article supporting elements of two different types, that is, each arranged to handle an article of a different type and, more particularly, of a different diameter, it is necessary to provide a novel system for delivering and removing articles from table 25. Furthermore, it is desirable to provide a construction whereby a minimum amount of adjustment will be necessary in changing the machine from operation upon one type of article to operation upon another type.

In order to afford simplicity in changing operations, the present apparatus has the alternately positioned elements 24 and 26 equidistantly spaced about table 25 and all pockets of the dials 34 and 30 are similarly spaced and by a distance equal to the spacing between the center point of two adjacent elements on table 25. Also, to avoid necessity of adjusting the detector mechanism, the vertical axes of all types of articles move on the same pitch circles of the table and dials 34 and 30. In addition, all trips 32 have their operating edges on the same circumferential line and can detector 35 is so mounted as to respond to all sizes of cans to be handled.

However, in addition to the above arrangements, the apparatus is designed to meet the following condition: In many plants, and particularly in beverage handling plants, it is customary to have articles move between machines while spaced at random, rather than keep the articles spaced according to the requirements of the various machines. Furthermore, it is the practice to deliver articles to each machine at a somewhat faster rate than the machine can handle. The result of this is that the articles accumulate at the infeed of the machine and stand in direct contact with each other, making it necessary to space their actual feed into the machine. The purpose of over-supplying succeeding machines is to avoid stoppage in the event that a machine in advance stops temporarily, or there is a momentary pause in delivering the containers or other articles to the line of machines.

The mechanism described below and illustrated in Figures 1 and 11 to 14 takes account of all the above factors.

Referring to Figure 11, the screw conveyor 23 comprises a tubular body portion 140 provided with a spirally extending rib or thread 141 which increases in diameter from its receiving end 142 to its delivery end 143. The pitch of the thread 141 may be somewhat reduced at its infeed end 141a but is uniform throughout the remainder of its extent. The body 140 has a pin 144 extending from its receiving or inlet end into a journal bore 145 provided in the upper end of a carrier bracket 146. Bracket 146 is pinned at its lower end (Figure 13) by a pin 166 to a rod 163 mounted for swinging movement in brackets 167 and 165 secured to a plate 165a fixed to the side frame of table 21. A pin 148 (Figure 11) extends from the delivery or outfeed end of the body sleeve into a journal aperture 149 in a carrier bracket 150. Bracket 150 is also pinned at its lower end to the rod 163 by a pin 166.

Figure 12:
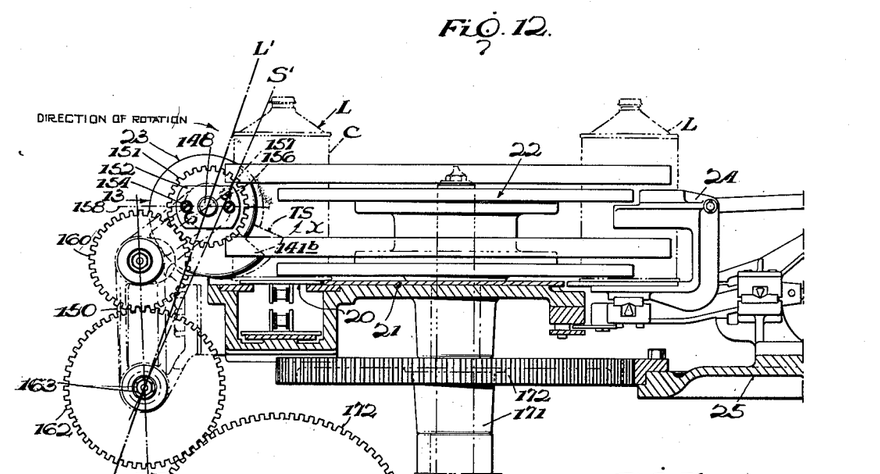
Figure 12 is a transverse sectional view on the line 12—12 of Figure 1.

Pin 148 extends past the journal bracket and has a pinion 151 mounted thereon. Beyond the pinion a plate 152 is secured to the pin 148 by a transverse pin 153. As also shown in Figure 12, plate 152 is secured to the pinion 151 by means of a pair of machine screws 154 which extend through apertures in plate 152 and thence into a pair of threaded sockets 155 in the outer surface of the pinion 151. As indicated in dotted lines in Figure 12, a second pair of sockets 156 is provided in the pinion 151, the sockets 156 being arranged on a line 157 extending on an angle to the line 158 on which the sockets 155 are positioned. It will be observed from this that the pin 148 and screw conveyor 23 may be disconnected from pinion 151 by unthreading the machine screws 154 and that by then rotating the screw conveyor with respect to the pinion 151, the machine screws may be threaded into the other pair of sockets so that the relation of the screw conveyor 23 with respect to pinion 151 will be changed.

Pinion 151 is rotated by an intermediate pinion 160 rotatable on a journal sleeve carried by a stud 161 fitted in a bore 172 in carrier bracket 150. Intermediate pinion 160 is, in turn, driven by a pinion 162 journaled on rod 163.

Figure 14:
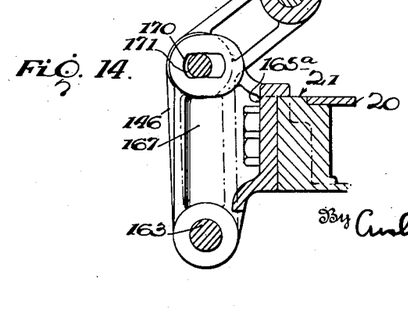
Figure 14 is a vertical sectional view on the line 14—14 of Figure 13.

The stud 161 carrying the intermediate pinion 160 extends through carrier bracket 150 and through an arcuate slot 170 in fixed bracket 165. The latter end of stud 161 is threaded to receive a nut 174 which will bear on fixed bracket 165. A stud 171 mounted in the other carrier bracket 146 in alignment with stud 161 also extends through a slot 170 in fixed bracket 167 as shown in Figure 14 and carries a nut 174. By the above arrangement the screw conveyor 23 may be moved inwardly or outwardly with respect to the center-line of conveyor 20 by loosening the nuts 174 so that the studs 161 and 171 will be free to move in the arcuate slots 170 of fixed brackets 165 and 167. It will be observed that the carrier bracket 146 which carries one end of screw conveyor 23 will thereby be free to swing with rod 163 as its pivot and that the other carrier bracket 150, carrying intermediate pinion 160 and pinion 151 and supporting the other end of screw conveyor will simultaneously swing. The nuts 174 will hold the carrier brackets and screw conveyor 23 in adjusted position.

The pinion 162 is driven in synchronism with the infeed dial shaft 171 through a train of gears diagrammatically indicated by the numeral 172 in Figure 12.

The dial shaft 171 is adapted to support a different type of infeed dial for each type of container being handled. For example, referring to Figure 11, if the machine is to handle 32 oz. and 12 oz. beer cans, the dial 22 shown in solid lines would be used with 32 oz. cans L. On the other hand, when handling 12 oz. beer cans S, the dial 22a shown in dotted lines in Figure 11 would be used. Both dials move cans in such manner that the axes of the cans will move along an arcuate line DP concentric with the axis of dial shaft 171. Since the two types of cans are of different diameter, the pockets 175 of dial 22, adapted for handling the larger or 32 oz. cans L, are somewhat deeper radially of the dial than the pockets 176 of the dial 22a used with the smaller cans. The pockets 176 are so formed that cans S will have their axes spaced the same distance circumferentially of shaft 171 as the cans L will be spaced by the pockets 175.

In order to hold all containers on the center-line CC of conveyor 20, a guide is provided opposite screw conveyor 23 in the form of a gate arm 178 of well known construction pivotally mounted at 178a on a plate 178b adjustably mounted for movement toward and from the center-line of conveyor 20. Hence the position of arm 178 may be adjusted to define the width of the container passage by adjusting the position of plate 178b on table 21. In Figure 11 the position which guide 178 would occupy for small cans S is indicated in dotted lines at 178'.

As is usual plate 178b carries a switch 20a adapted to be actuated to stop the machine if containers become jammed adjacent the infeed dial and thereby swing gate arm 178 outwardly against the operating button of the switch.

Since screw conveyor 23 may be swung inwardly or outwardly with its carrier brackets 146 and 150 by loosening the nuts 174, the screw conveyor may be positioned to cooperate with guide or gate arm 178 to hold containers on center-line CC. The position which the inner surface of the body portion 140 of screw conveyor 23 will occupy when handling small cans S is indicated in dotted lines at 23a in Figure 11. It will be understood that additional side guide elements will extend to the left in Figures 11 and 1 and that these may be adjusted to positions in alignment with guide 178 and the body portion 140 of the screw conveyor.

In addition, the guide plate 177 which partially surrounds the dials to retain cans in the dial pockets must be moved from the solid line position of Figure 11 to the dotted line position when handling small cans to cooperate with dial 22a to maintain the axes of the cans S on line DP.

Generally speaking, the operation of the infeed conveyor 20 and screw conveyor 23 in delivering articles to the infeed dials 22 and 22a and the operation of the dials with respect to table 25 is as follows: The infeed conveyor 20 moves continuously at a proper speed with respect to the linear speed of the dial shaft 171 and the latter is of course so geared with table shaft 40 and the other dial shafts of the machine that all will move in properly timed relation. The conveyor 20 also moves at such speed with respect to the rotation of the screw conveyor 23 that containers will be delivered to the receiving end of the screw conveyor at such rate that a line of containers will accumulate and stand in contact with each other at the receiving end of the screw conveyor. In other words, the infeed conveyor 20 moves with sufficient rapidity to insure that a number of articles slightly in excess of the capacity of the screw conveyor 23 will be delivered adjacent the latter conveyor. For this purpose, conveyor 20 may be driven through a variable speed mechanism which will permit the desired selectivity in its rate of movement.

During their movement along the infeed conveyor 20 and with the screw conveyor 23, the containers will be maintained in a straight line by the adjustable guide described above so that the vertical axes of the containers will stand upon the center-line CC of the conveyor 20.

Referring to operation with large cans L such as shown in solid lines in Figure 11, during its rotation, the portion of the thread 141 shown in solid lines at the receiving end 141a of the screw conveyor 23 will move between a container L at position A in Figure 11 and a container L at position B so that the container at position B is gradually permitted to move toward the infeed dial due to the advancing action of the infeed conveyor 20 moving beneath the container. In other words, the infeed conveyor 20 advances the containers L, while the thread 141 of the screw conveyor 23 simply retards or times the movement of the containers so as to eventually place them in timed relation with the pockets of the solid line infeed dial 22.

Figure 13:
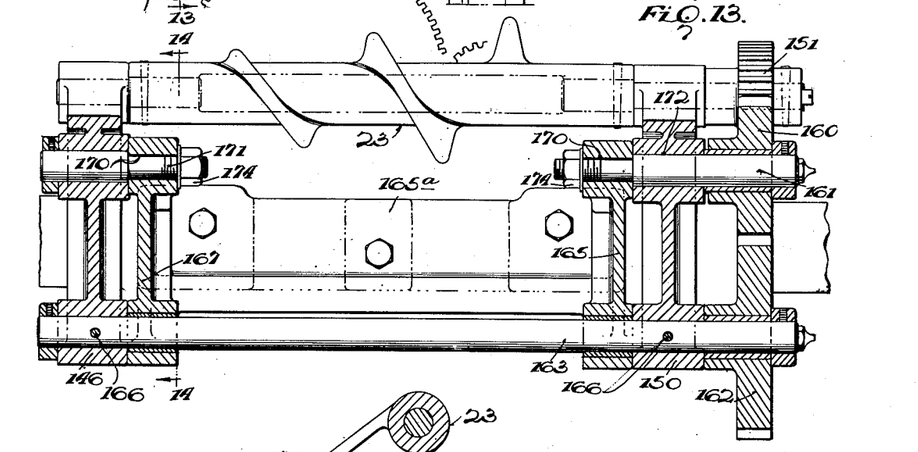
Figure 13 is a vertical sectional view on the line 13—13 of Figure 12.

As is indicated in solid lines in Figure 11, when a large container reaches position C, where it is bearing against the delivery portion 141b of the thread 141 shown in solid lines, a pocket 175c of the infeed dial 22 is moving toward the container. Figure 13 shows the position of can L at position C as viewed from the right in Figure 11, and it will be seen that the delivery end 141b of the thread is almost out of the path of the container at position C. At about the instant that the axis of the container at C moves onto the pitch circle DP of the dial 22, the advancing tooth 175c of the infeed dial will contact with the rearward surface of the container to then move it toward the table 25. Just prior to this moment, the extreme delivery end 141b of the solid line thread 141 will move downwardly and out of the path of container L.

As shown in Figure 1, each dial pocket 175 is so positioned with respect to dial shaft 171 and the latter is so timed with table shaft 40 that the can pushing wall of each dial pocket 175 will form a continuation of the circular portion of the trailing arm 50a of a weighing element 24 at the moment a can L moves upon element 24, i. e., at position D in Figure 1.

The adjustment which must be made in the screw conveyor 23 to enable it to deliver smaller containers in properly timed relation to an infeed dial, and also the different position with respect to the position of large container dial 22 of a dial such as 22a for handling smaller containers and placing them on elements 26 instead of elements 24 is clearly illustrated in Figure 11. More particularly, if the machine, while handling large containers L with the dial 22 were to be stopped at the moment in the rotation of infeed dial shaft 171 and screw conveyor 23 indicated in solid lines in Figure 11, so that a changeover to handle smaller containers could be made at that instant, the following action would be necessary: Guide 177 would have to be moved to the dotted line position of Figure 11 and guide 178 would have to be moved to dotted line position 178'. Also screw conveyor 23 would have to be swung inwardly on rod 163 to place its body portion 140 at the dotted line position 23a of Figure 11. Referring to Figure 12, in making this latter adjustment, the shaft 148 forming the axis of conveyor 23 would be swung from a position on line L' to a position on line S'. The infeed dial 22a would have to be placed upon infeed dial shaft 171 with its pockets positioned as indicated in the dotted lines in Figure 11 showing the dial 22a in outline. It will be noted that the pockets 176 of dial 22a are shown positioned substantially midway between the positions of the pockets 175 of dial 22. In fact, the pockets 176 will hold the vertical axes of cans S equidistant between the points at which the pockets 175 will hold the axes of cans L. This is, of course, necessary because the pockets 176 are to deliver cans or other articles to the elements 26 which are positioned on table 25 to hold the axes of cans S equidistantly between the points at which elements 24 hold the axes of cans L. The keyway in dial 22a to fit the key on shaft 171 would be so positioned with respect to the dial pockets 176 as to obtain this position.

Figure 11 also shows that the pocket 176c of dial 22a which is next to receive a can S from screw conveyor 23 is considerably backwardly of the position which was occupied by the pocket 175c of dial 22, which pocket was about to receive a can L. To compensate for this, it is necessary to rotate the screw conveyor 23 backwardly, i. e., in the direction of the arrow X in Figure 12 to position the delivery end 141b of thread 141 at the dotted line position TS in Figure 12. Thus, bearing in mind the fact that the screw conveyor normally rotates in a clockwise direction in the manner indicated in Figure 12, a greater length of thread 141 will be placed in the path of a small container S occupying position C in Figure 11 so that such a container will not be freed from screw conveyor 23 until the pocket 176c reaches the proper point with respect to the center-line CC of infeed conveyor 20.

In order to turn the screw conveyor 23 backwardly as described above, plate 152 is disconnected from pinion 151 and element 23 turned backwardly to bring the apertures in plate 152 in alignment with the threaded sockets 156 in pinion 151 and then replacing the machine screws 154. As stated above, this will place the delivery end 141b of thread 141 at the dotted line position TS of Figure 12. Position TS is offset in Figure 12 with respect to the solid line showing of thread end 141b because the axis of conveyor 23 is now on line S' whereas the solid line showing is on line L'.

It will be noted from the dotted line showing of Figure 11 that small cans will then be positioned at A', B' and C' under control of the screw conveyor, proper allowance having been made for the smaller diameter of the cans S, and the smaller size, both radially and circumferentially of dial shaft 171, of the pockets 176 as compared to the pockets 175.

With all the elements positioned as described above for the handling of small containers S, full allowance would be made for the small diameter of the containers S, and they will be delivered to the infeed dial 22a with their vertical axes spaced the same linear distance apart, to move around the infeed dial shaft on the pitch circle DP and be placed on the elements 26.

It will be understood that the infeed mechanism described herein as well as the other arrangements whereby the apparatus may handle different types of containers are applicable to machines other than weighing apparatus.

The terminology used in the specification is for the purpose of description, and not limitation, the scope of the invention being indicated by the claims.

I claim:

1. In a machine for weighing articles, a moving carrier, a plurality of article weighing elements mounted on and vertically movable with respect to the carrier according to the weight of the articles, detector means in the path of movement of said elements adapted to be actuated if an article carried by an element is not of a predetermined weight, a reject member controlled by said detector means and adapted to move into the path of an article to remove the same from a weighing element, and re-set means beyond said detector means and in the path of movement of said weighing elements to be operated by the latter to return said reject member to normal position.

2. In a machine for weighing articles, a moving carrier, a plurality of article weighing elements mounted on and vertically movable with respect to the carrier according to the weight of the articles, detector means in the path of movement of said elements adapted to be actuated if an article carried by an element is not of a predetermined weight, a reject member controlled by said detector means and adapted to move into the path of an article to deflect the same from a weighing element, a rotary dial associated with said reject member to engage articles deflected by the latter, said dial being movable in synchronism with said carrier, said reject member, in its normal non-deflecting position serving to guide articles past said dial.

3. In a machine for weighing articles, a moving carrier, a plurality of weighing elements pivotally mounted on said carrier, a trip secured to each weighing element, a detector in the path of movement of said trips with said carried adapted to be actuated if the article on the corresponding weighing element is not of a predetermined weight, a reject member controlled by said detector means to deflect articles from the weighing elements, a re-set device beyond said detector, said device being adapted to actuate said reject member to non-deflecting position, said re-set device being positioned in a plane other than that in which said detector is positioned, and means between said detector and re-set device to direct all trips into contact with said re-set device.

4. In an apparatus for weighing articles, a carrier, a plurality of article weighing elements pivoted on said carrier, detector means in the path of said weighing elements adapted to be contacted by the latter if an article carried thereby is not of a predetermined weight, a second detector positioned to simultaneously contact with articles on said elements, and a reject member controlled by said detectors and adapted to be moved into the path of the articles when both of said detectors are simultaneously actuated.

5. In an apparatus for weighing articles, a carrier, a plurality of article weighing elements pivoted on said carrier, a trip on each weighing element, a detector in the path of said trips and adapted to be actuated by the latter if the article carried by the corresponding weighing element is not of a predetermined weight, a reject member actuated by operation of said detector, a re-set device adapted to be actuated by the same trip to restore the reject member to normal position, said detector and re-set device being more closely spaced than the trips of two adjacent weighing elements.

6. In combination, a carrier, a plurality of elements to support articles of one size, a plurality of elements to support articles of a second size, the elements for one size article being alternately positioned upon the carrier with respect to the elements for articles of the second size, all of said elements being mounted for movement with respect to said carrier, and selectively movable means to lock the elements for one size of article against movement relative to the carrier.

7. In combination, a carrier, weighing elements for articles of one size, weighing elements for articles of a second size, the elements for one size article being alternately positioned upon the carrier with respect to the elements for articles of the second size, all of said elements having trips thereon, means to lock the elements for articles of one size with respect to the carrier, a detector adapted to be actuated by a trip when the article carried by the corresponding element is not of a predetermined weight, a reject member operated to deflect articles upon actuation of said detector, a re-set device for said reject member adapted to be engaged by the trip of every weighing element, said re-set device and said detector being spaced more closely than the trips upon two adjacent weighing elements.

8. In combination, a rotary dial shaft adapted to selectively receive one of a plurality of dials each of which has article engaging pockets of different sizes, article advancing means, a timing device to control movement of articles with said means, means to operate said timing device and dial shaft in synchronism, and means to selectively connect said timing device to said driving means in a plurality of different driving relationships according to the dial used upon said dial shaft.

9. In combination, a rotary dial shaft adapted to selectively receive one of a plurality of dials each of which has article engaging pockets of different sizes, article advancing means, a screw conveyor element to control movement of articles with said means, means to drive said screw conveyor and dial shaft, and means to selectively connect said screw conveyor to said driving means in a plurality of different driving relationships according to the dial used upon said dial shaft.

10. In combination, a rotary dial shaft adapted to selectively receive one of a plurality of dials each of which has article engaging pockets of different sizes, with the pockets of a dial of one size positioned at a different point circumferentially of the dial shaft from that at which the pockets of the other dials would be positioned article advancing means, a timing device to control movement of articles with said means, means to drive said timing device and dial shaft, and means to selectively connect said timing device to said driving means in a plurality of different driving relationships according to the dial which is used upon said dial shaft.

11. In combination, a continuously moving conveyor, a rotary dial shaft adapted to selectively receive one of a plurality of dials each having article engaging pockets of different sizes, a screw conveyor, a shaft supporting said screw conveyor, and means to drive said shafts, said screw conveyor being selectively movable circumferentially of its shaft to vary the postion of its thread along a line normal to the axis of said dial shaft according to the type of dial used on said dial shaft.

12. In an article handling apparatus, a rotary table, a set of supporting elements for articles of one size and a set of supporting elements for articles of a second size mounted on said table, all of said supporting elements being adapted to maintain articles with their vertical axes on the same line circumferentially of said table, rotary means to remove articles from said elements, said rotary means having pockets of sizes to receive all articles handled on said rotary table and so spaced as to move in alignment with the correspondingly-sized elements on said table, and means to deliver articles to said supporting elements comprising a driving means arranged to selectively receive infeed dials respectively provided with pockets of such size and so spaced as to deliver articles to a desired set of supporting elements of the rotary table.

13. In a machine for weighing articles, a rotary carrier of circular form, a plurality of weighing elements to support articles of one size, a plurality of weighing elements to support articles of a second size, the elements for one size article being alternately positioned upon the table with respect to the elements for articles of the second size, all of said elements being pivoted on said table, each of said elements including a balance beam extending from its point of pivotal support toward the axis of the table, the balances of the beams for one type of element being spaced further from the axis of the table than the balances on the beams of the other type of element to enable the elements to be closely spaced circumferentially of the table.

14. In an article handling apparatus, a rotary table, a set of supporting elements for articles of one size, a set of supporting elements for articles of a second size, all of said elements being mounted on said table, elements for one size being alternately positioned with respect to elements for the other size, all of said elements being adapted to maintain articles with their vertical axes on the same line circumferentially of said table, said elements being equidistantly spaced about said table, a rotary dial to remove articles from said elements, said rotary dial having alternately-arranged pockets of sizes corresponding to the sizes of said supporting elements, which pockets are equidistantly spaced about said dial in accordance with the spacing of said elements on said table, and means to deliver articles to said supporting elements comprising an infeed dial shaft adapted to selectively receive infeed dials respectively provided with pockets spaced according to the spacing of one set of supporting elements on said table.

15. In a machine for weighing articles, a rotary table, a plurality of weighing elements for articles of one size, a plurality of weighing elements for articles of a second size, the elements for one size article being alternately positioned upon the carrier with respect to the elements for articles of the second size, selectively operable means to lock the elements for one size of article against movement relative to the table, all of said elements having trip devices positioned on the same line circumferentially of said table, and detector means responsive to an element carrying an article not of a predetermined weight.

16. The combination in an apparatus for weighing articles, of a rotary table having a support thereon provided with intersecting horizontal apertures, one aperture extending radially of the table and the other aperture being normal to the first aperture, a scale beam extending through the radial aperture and provided with a downwardly facing knife edge bearing in the second aperture, a balance at the inner end of said scale beam, an upwardly facing knife edge at the outer end of said scale beam, a platform above and bearing on said last-named knife edge, said platform including an upstanding article engaging portion projecting above said scale beam, an upwardly extending portion on said support and above said scale beam, and a link extending between the upwardly extending portion of said support and the upstanding portion of said platform, whereby said platform will be maintained horizontal regardless of tilting of said scale beam.

17. In a machine for weighing articles, a moving carrier, a plurality of weighing elements each pivoted on said carrier on a horizontal axis, a trip secured to each weighing element, a detector pivoted on a vertical axis alongside the path of movement of the carrier and including a substantially vertical face arranged to be contacted by the trip of a weighing element if the article carried by the latter is within a predetermined weight range, said face of said detector being inclined at such angle as to conform to the arc of vertical swinging movement of said trips.

18. In a machine for weighing articles, a moving carrier, a plurality of weighing elements each pivoted on said carrier on a horizontal axis, a trip secured to each weighing element, a detector mounted alongside the path of movement of the carrier and arranged to be contacted by the trip of a weighing element if the article carried by the latter is within a predetermined weight range, a reject member controlled by said detector, said detector being vertically adjustable with respect to said carrier to vary the range during which trips will contact therewith and being operatively connected to said reject member in such manner that the detector may move vertically independently of the reject member.

EDWIN ROLKER.